United States Patent [19]

Bax

[11] Patent Number: 4,480,215
[45] Date of Patent: Oct. 30, 1984

[54] SYNCHRONOUS ELECTRIC MOTOR CONTROL SYSTEMS

[75] Inventor: Anton M. Bax, Forthampton, England

[73] Assignee: Smiths Industries Public Limited Company, London, England

[21] Appl. No.: 434,810

[22] Filed: Oct. 18, 1982

[30] Foreign Application Priority Data

Oct. 27, 1981 [GB] United Kingdom ............... 8132287

[51] Int. Cl.³ .............................................. G05B 5/00
[52] U.S. Cl. .................................. 318/306; 318/307; 318/318; 318/314
[58] Field of Search ............................ 74/5.6 R–5.6 E, 74/5.7; 318/306, 307, 318, 314, 311, 326–329, 615–618, 608, 702, 721

[56] References Cited

U.S. PATENT DOCUMENTS

| | | | |
|---|---|---|---|
| 3,569,808 | 3/1971 | Goto | 318/318 X |
| 4,143,311 | 3/1979 | Lee | 318/702 X |
| 4,223,261 | 9/1980 | White | 318/314 X |
| 4,266,432 | 5/1981 | Schroeder et al. | 318/318 |
| 4,269,073 | 5/1981 | McIntyre | 318/318 X |
| 4,314,188 | 2/1982 | Voigt | 318/318 X |

Primary Examiner—Ulysses Weldon
Attorney, Agent, or Firm—Pollock, Vande Sande & Priddy

[57] ABSTRACT

A gyroscope motor control system has a phase-locked loop circuit and an antihunting circuit. The phase-locked loop circuit has a voltage-controlled oscillator which produces the drive signal for the motor. The frequency of the oscillator is controlled by the output of a phase discriminator which is in turn dependent on the difference in phase between a reference frequency and a feedback signal from the motor drive signal. A capacitive pick-off senses the speed of rotation of the gyroscope inertia wheel and a signal in response to this speed is supplied to a directional phase discriminator together with the feedback signal. The output of the discriminator varies with change in phase difference between its two inputs, and is supplied via a switching transistor to the input of the oscillator to effect minor variations in its frequency such as to reduce fluctuations in motor speed. The transistor is held off until there is substantial synchronism with the motor drive signal and the inertia wheel speed.

9 Claims, 1 Drawing Figure

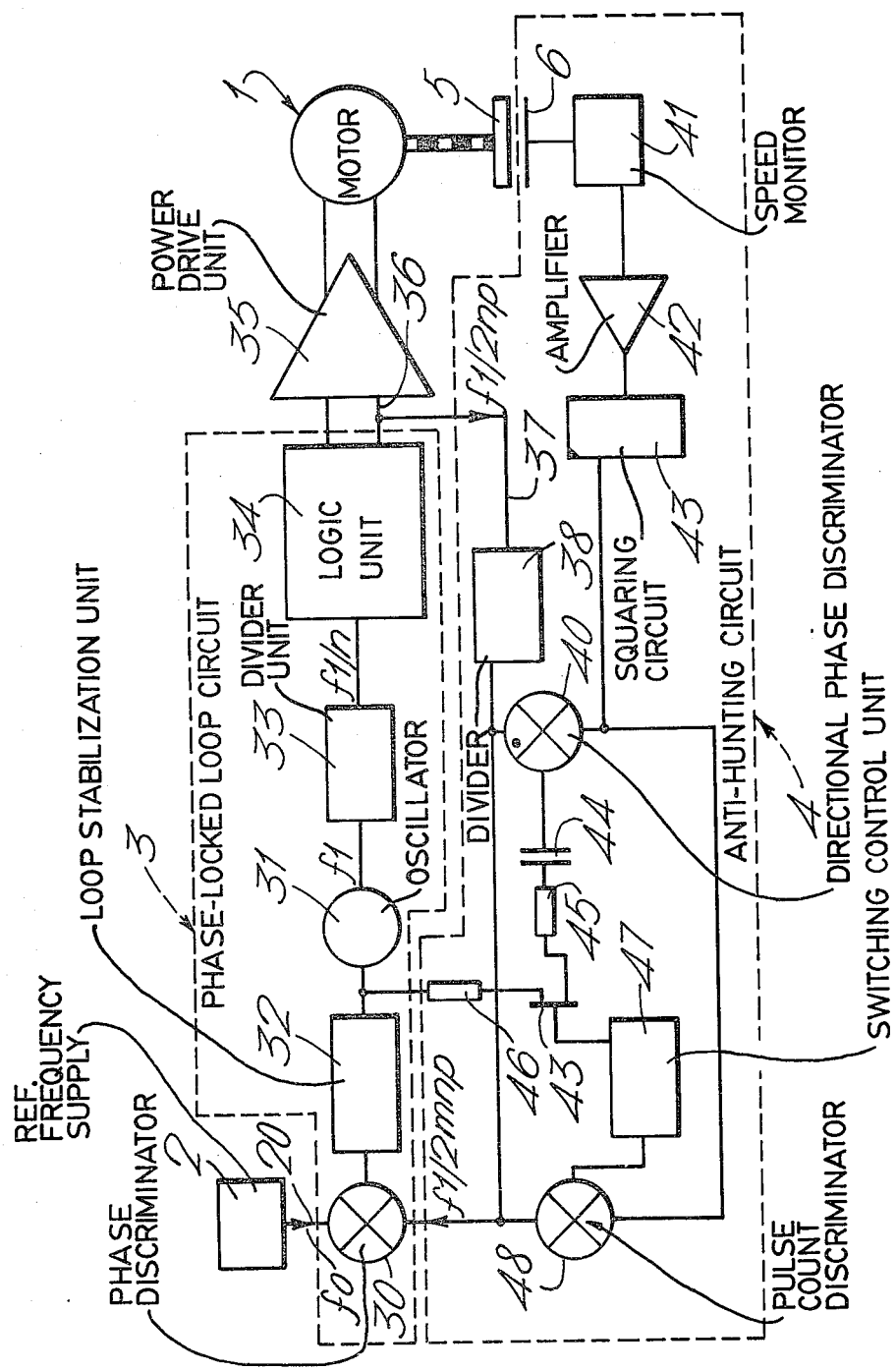

SYNCHRONOUS ELECTRIC MOTOR CONTROL SYSTEMS

BACKGROUND OF THE INVENTION

This invention relates to synchronous electric motor control systems and to gyroscope apparatus including such control systems.

Many arrangements have been proposed for controlling the speed of an electric motor so that it is maintained substantially constant. Difficulties, however, are experienced in reducing the minor fluctuations of motor speed, or hunting, such as is caused by defects or wear in the motor bearings. Problems also occur in starting the motor from its stationary state when some motor control circuits are used.

BRIEF SUMMARY OF THE INVENTION

It is an object of the present invention to provide a motor control system that can be used to alleviate these difficulties and problems.

According to one aspect of the present invention, there is provided a control system for a synchronous electric motor comprising: a phase-locked loop circuit having an oscillator the frequency of which is controlled by the magnitude of its input signal, and a feedback loop whereby a feedback signal is derived from the drive signal supplied to said motor, said feedback signal being used to control the magnitude of said input signal; and an anti-hunting circuit including monitor means arranged to provide a speed signal in response to rotation of the rotor of said motor, first comparator means for comparing said speed signal with said feedback signal such as to produce an output signal in accordance with any change in phase difference between said speed signal and said feedback signal, and means for supplying said output signal to said phase-locked loop circuit such as to reduce fluctuations in the speed of said motor.

The time lag between the drive signal and rotor movement causes a phase shift between the feedback signal and the speed signal when there is any change in the drive signal. This phase shift is detected and used to apply appropriate correction to the oscillator.

The control system may include second comparator means connected to receive said speed signal and said feedback signal, said second comparator means producing an output signal in accordance with the difference in frequency of said speed signal and said feedback signal, switching means connected intermediate said first comparator and said phase-locked loop, and means coupling the output of said second comparator means with said switching means so that said switching means is controlled by the output of said second comparator means to prevent supply of the output of said first comparator means to said phase-locked loop circuit when the rotor is out of frequency synchronism with said drive signals. The system may include a control unit having a time delay, said control unit being connected intermediate said switching means and said second comparator means so that said switching means passes the output of said first comparator means to said phase-locked loop circuit only after a predetermined time delay following said rotor and said drive signal coming into synchronism with one another. The phase-locked loop circuit may include a phase discriminator having two inputs and an output, means connecting one input of said phase discriminator to receive an output from a reference frequency supply, means connecting the other input of said phase discriminator to receive said feedback signal, and means connecting the output of said phase discriminator to said oscillator so as to control said oscillator in accordance with the phase difference between said two inputs. The output from the first comparator means is applied to the phase-locked loop at the input of said oscillator.

According to another aspect of the present invention there is provided gyroscope apparatus including a motor arranged to apply drive to rotate an inertia member, and a control system of the above-specified kind.

Gyroscope apparatus including a control system, both in accordance with the present invention, will now be described, by way of example, with reference to the accompanying drawing.

BRIEF DESCRIPTION OF THE DRAWING

The drawing shows the gyroscope apparatus schematically.

DETAILED DESCRIPTION

A gyroscope synchronous electric motor 1 is driven by signals which are derived from a reference frequency supply 2 and which are controlled by a phase-locked loop circuit 3 and an anti-hunting circuit 4.

The supply 2 is of standard form and, in this respect, may, for example, be crystal controlled such as to produce a digital signal on line 20 at a substantially constant frequency $f_0$. The line 20 connects with the phase-locked loop circuit 3 and, more particularly, with one input of a standard phase discriminator 30. At its output, the phase discriminator 30 is connected to a voltage-controlled oscillator 31 via a loop-stabilisation unit 32. The output of the oscillator 31, at a frequency $f_1$ is supplied to a divider unit 33 which in turn supplies a signal at a frequency $f_1/n$ to a multi-phase decode logic unit 34. The output of the logic unit 34 is a signal at a frequency $f_1/2np$ (where p is twice the number of phases of the motor 1) which is amplified by a power drive unit 35 and used to drive the motor 1. A feedback signal is taken from one of the phase outputs 36 of the logic unit 34 and supplied via line 37 to a second divider 38. The output of the divider 38 is at a frequency $f_1/2mnp$, where m is the divider ratio, and this is supplied to the other input of the phase discriminator 30.

The output of the second divider 38 is also connected with the anti-hunting circuit 4 and, more particularly, provides a signal to one input of a directional phase discriminator 40 within the anti-hunting circuit. The other input of the discriminator 40 receives signals from a motor speed monitor 41 via an amplifier 42 and squaring circuit 43 which produces an output of one pulse for every revolution of the motor rotor. The monitor 41 senses rotation of the gyroscope inertia wheel 5 itself and, in different applications, it will be appreciated that the speed signal may be derived from other rotating members driven by the motor. The monitor 41 may be of many different forms, such as, for example, employing mechanical, capacitive, inductive, optical or magnetic principles. In the present arrangement capacitive pick-offs 6 are used which derive a speed signal from minor oscillations of the gyroscope inertia wheel 5. The output of the discriminator 40 is connected to one terminal of a switching transistor 43 via a capacitor 44 and resistor 45. The other terminal of the transistor 43 is connected via a resistor 46 to the input of the voltage controlled oscillator 31 in the phase-locked loop circuit 3. The gate of the transistor 43 is connected to a switching control unit 47 that is controlled by the output of a pulse count discriminator unit 48. The unit 48 has two inputs, one of which is supplied from the output of the divider 38 and the other of which is the one pulse per revolution signal from the squaring circuit 43.

Considering now firstly the operation of the phase-locked loop circuit 3, the output of the phase discriminator 30 is dependent on the difference between the two input signals at frequencies $f_0$ and $f_1/2mnp$. Any difference between these two inputs causes a change in the output of the phase discriminator 30 thereby causing the frequency $f_1$ of the voltage-controlled oscillator 31 to be increased or decreased in a sense bringing about equality at the inputs. In this way the drive signal supplied to the motor 1 is maintained at a substantially constant frequency.

The voltage-controlled oscillator 31 is also controlled by signals from the anti-hunting circuit 4 which are derived in response to any change in the phase difference between the drive signal applied to the motor 1 and the actual rotation of the inertia wheel 5 driven by the motor. The directional phase discriminator 40 receives at its two inputs respectively, a sample of the drive signal (the feedback signal) and the wheel speed signal from the squaring circuit 43. There will normally be a phase difference between these two signals but, if the motor is running at a constant speed, without fluctuations, this phase difference will be constant. If however, there is any fluctuation in the drive signal, such as a low frequency signal superimposed on the drive signal caused by hunting, the phase difference between the drive signal and the rotation of the wheel 5 will fluctuate. This is sensed by the directional phase discriminator 40 and an appropriate correction signal is applied to the input of the voltage-controlled oscillator 31 (the transistor 43 normally being in a conducting "on" state) to compensate for the phase change. The correction signal either causes the frequency of the drive signal to be increased or decreased slightly.

It will be appreciated that, when starting the motor 1, there is inevitably a time lag that occurs until the inertia wheel 5, is running in synchronism with the drive signal. In normal circumstances this time lag would cause spurious control signals from the anti-hunting circuit 4. To overcome this problem, the transistor 43 is maintained non-conductive, that is, in an "off" state until substantial synchronism is achieved, thereby ensuring that the motor 1 is initially controlled solely by the phase-locked loop circuit 3. This is achieved by means of the pulse count discriminator 48 and the switching control unit 47. The pulse count discriminator 48 receives input signals in respect of the drive signal frequency and the actual inertia wheel speed and produces output pulses until such time as the wheel speed signal is substantially in synchronism with the drive signal frequency. When synchronism is achieved the discriminator 48 stops the supply of pulses to the switch control unit 47. The unit 47 includes a time delay monostable circuit of known construction which acts to bias the transistor 43 to an "on" state after a predetermined time delay has occurred following the termination of pulses from the discriminator 48. The anti-hunting circuit 4 is then operative to contribute to the control of the motor drive.

If synchronisation is lost during operation for any reason, such as, an excessive load on the motor, the anti-hunting circuit is again rendered inoperative.

The motor control circuit is particularly useful for gyroscopes but it will be appreciated that it has application with any synchronous motor where a constant speed is required.

I claim:

1. A control system for a synchronous electric motor comprising: a phase-locked loop circuit having an oscillator with an output and an input, the frequency of the output of said oscillator being dependent on a signal at its input, and drive means for producing a drive signal for said motor in response to the output of said oscillator; a feedback loop circuit connected intermediate the output of said drive means and the input of said oscillator whereby said feedback loop circuit derives a feedback signal from the drive signal supplied to said motor to control the frequency of said oscillator; and an anti-hunting circuit including monitor means that provides a speed signal in response to rotation of the rotor of said motor, first comparator means connected to receive said speed signal and said feedback signal, said first comparator means producing an output signal in accordance with any change in phase difference between said speed signal and said feedback signal, and means supplying said output signal from said first comparator means to the input of said oscillator in said phase-locked loop circuit so as to vary the input signal to the oscillator such as to reduce fluctuations in the speed of said motor.

2. A control system according to claim 1, including second comparator means connected to receive said speed signal and said feedback signal, said second comparator means producing an output signal in accordance with the difference in frequency of said speed signal and said feedback signal, wherein the means supplying the output signal from the first comparator means to the input of said oscillator includes switching means connected in series between said first comparator means and the input of said oscillator, and means coupling the output of said second comparator means with said switching means so that said switching means is controlled by the output of said second comparator means to prevent supply of the output of said first comparator means to said oscillator when the rotor is out of frequency synchronism with said drive signals.

3. A control system according to claim 2, including a control unit having a time delay, said control unit being connected intermediate said switching means and said second comparator means so that said switching means passes the output of said first comparator means to said oscillator only after a predetermined time delay following said rotor and said drive signal coming into synchronism with one another.

4. A control system according to claim 2, wherein said switching means includes a switching transistor.

5. A control system according to claim 1, including a reference frequency supply, wherein said phase-locked loop circuit includes a phase discriminator having two inputs and an output, means connecting one input of said phase discriminator to receive an output from said reference frequency supply, means connecting the other input of said phase discriminator to receive said feedback signal, and means connecting the output of said phase discriminator to said oscillator so as to control said oscillator in accordance with the phase difference between said two inputs.

6. A control system according to claim 1, wherein said monitor means includes a capacitive sensor mounted to sense rotation of a member coupled with said rotor.

7. A control system according to claim 6, wherein said monitor means is responsive to minor oscillations of said member indicative of the speed of rotation of said rotor.

8. A control system for a synchronous electric motor comprising: a reference frequency supply; a phase-locked loop circuit having an oscillator the frequency of which is controlled by the magnitude of a signal at its input, drive means connected with the output of said oscillator to produce drive signals for said motor in response to the output of said oscillator, a phase discriminator having two inputs and an output, means connecting one input of said phase discriminator to receive an output from said reference frequency supply, and means connecting the output of said phase discriminator to said oscillator so as to control said oscillator in accordance with the phase difference between said two inputs; a feedback loop circuit connected intermediate the output of said drive means and the other input of said phase discriminator whereby said feedback loop circuit derives a feedback signal from said drive signal to control the frequency of said oscillator; and an anti-hunting circuit including monitor means that provides a speed signal in response to rotation of the rotor of said motor, first comparator means connected to receive said speed signal and said feedback signal, said first comparator means producing an output signal in accordance with any change in phase difference between said speed signal and said feedback signal, and means supplying said output signal from said first comparator means to the input of said oscillator so as to reduce fluctuations in the speed of said rotor.

9. A gyroscope having a motor, an inertia member coupled with said motor for rotation by said motor, and a control system connected with said motor to provide drive signals for said motor, wherein said control system comprises: a reference frequency supply; a phase-locked loop circuit having an oscillator the frequency of which is controlled by the magnitude of a signal at its input, drive means connected with the output of said oscillator to produce said drive signals in response to the output of said oscillator, a phase discriminator having two inputs and an output, means connecting one input of said phase discriminator to receive an output from said reference frequency supply, and means connecting the output of said phase discriminator to said oscillator so as to control said oscillator in accordance with the phase difference between said two inputs; a feedback loop circuit connected intermediate the output of said drive means and the other input of said phase discriminator whereby said feedback loop circuit derives a feedback signal from said drive signal to control the frequency of said oscillator; and an anti-hunting circuit including monitor means that provides a speed signal in response to rotation of said inertia member, first comparator means connected to receive said speed signal and said feedback signal, said first comparator means producing an output signal in accordance with any change in phase difference between said speed signal and said feedback signal, and means supplying said output signal from said first comparator means to the input of said oscillator so as to reduce fluctuations in the speed of said inertia member.

* * * * *